Nov. 23, 1965     W. G. SMITH     3,219,066
AUTOMATIC FORMING AND WELDING MACHINE
Filed Oct. 2, 1962     4 Sheets-Sheet 1
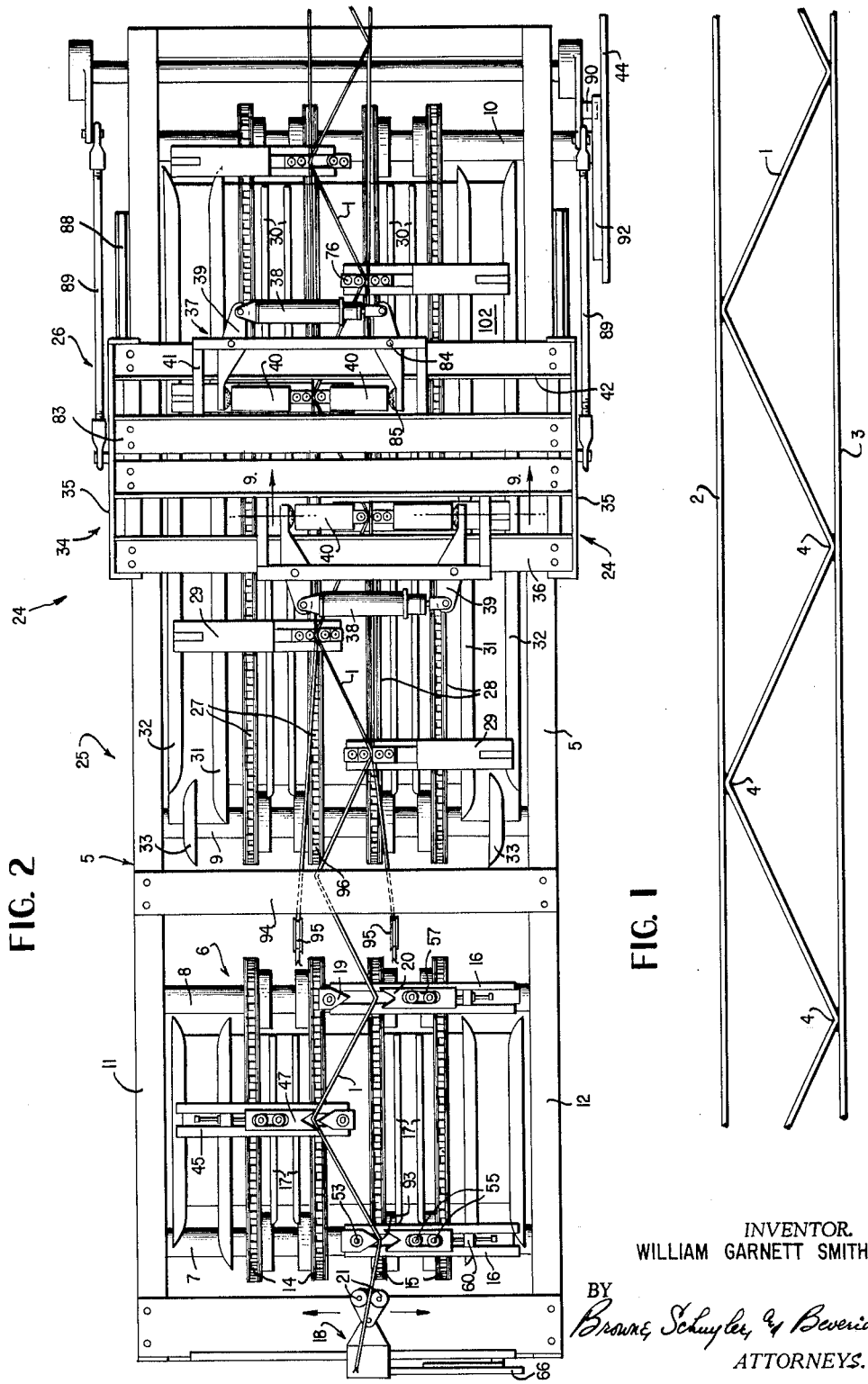
INVENTOR.
WILLIAM GARNETT SMITH
BY
Browne, Schuyler, & Beveridge
ATTORNEYS.

Nov. 23, 1965 W. G. SMITH 3,219,066
AUTOMATIC FORMING AND WELDING MACHINE
Filed Oct. 2, 1962 4 Sheets-Sheet 2

INVENTOR.
WILLIAM GARNETT SMITH
BY
Browne, Schuyler & Beveridge
ATTORNEYS.

Nov. 23, 1965 W. G. SMITH 3,219,066
AUTOMATIC FORMING AND WELDING MACHINE
Filed Oct. 2, 1962 4 Sheets-Sheet 3
FIG. 5
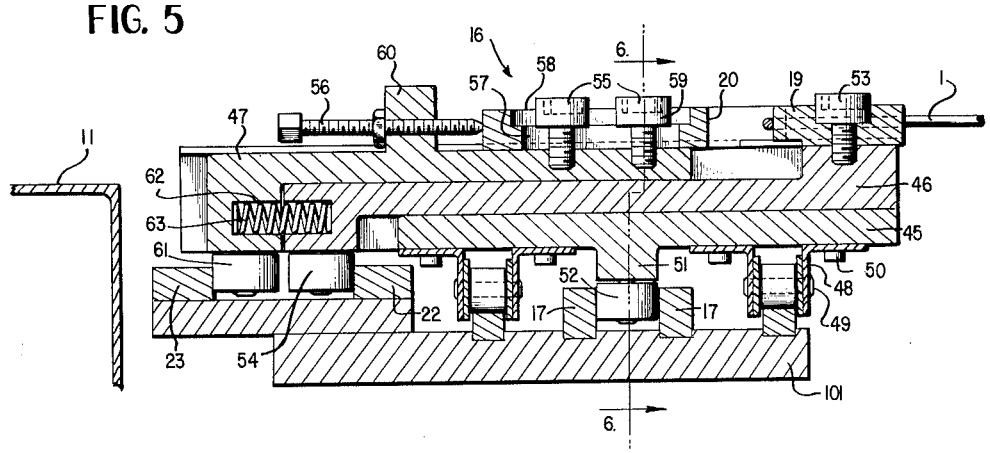
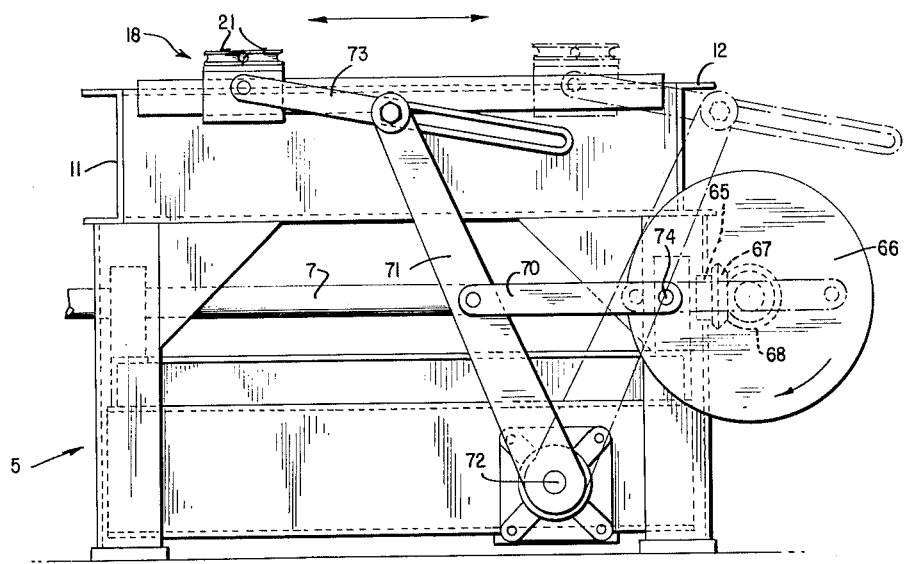
FIG. 7
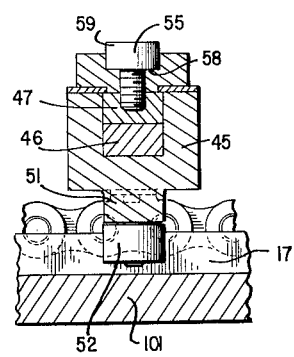
FIG. 6
INVENTOR.
WILLIAM GARNETT SMITH
BY
Browne, Schuyler, & Beveridge
ATTORNEYS.

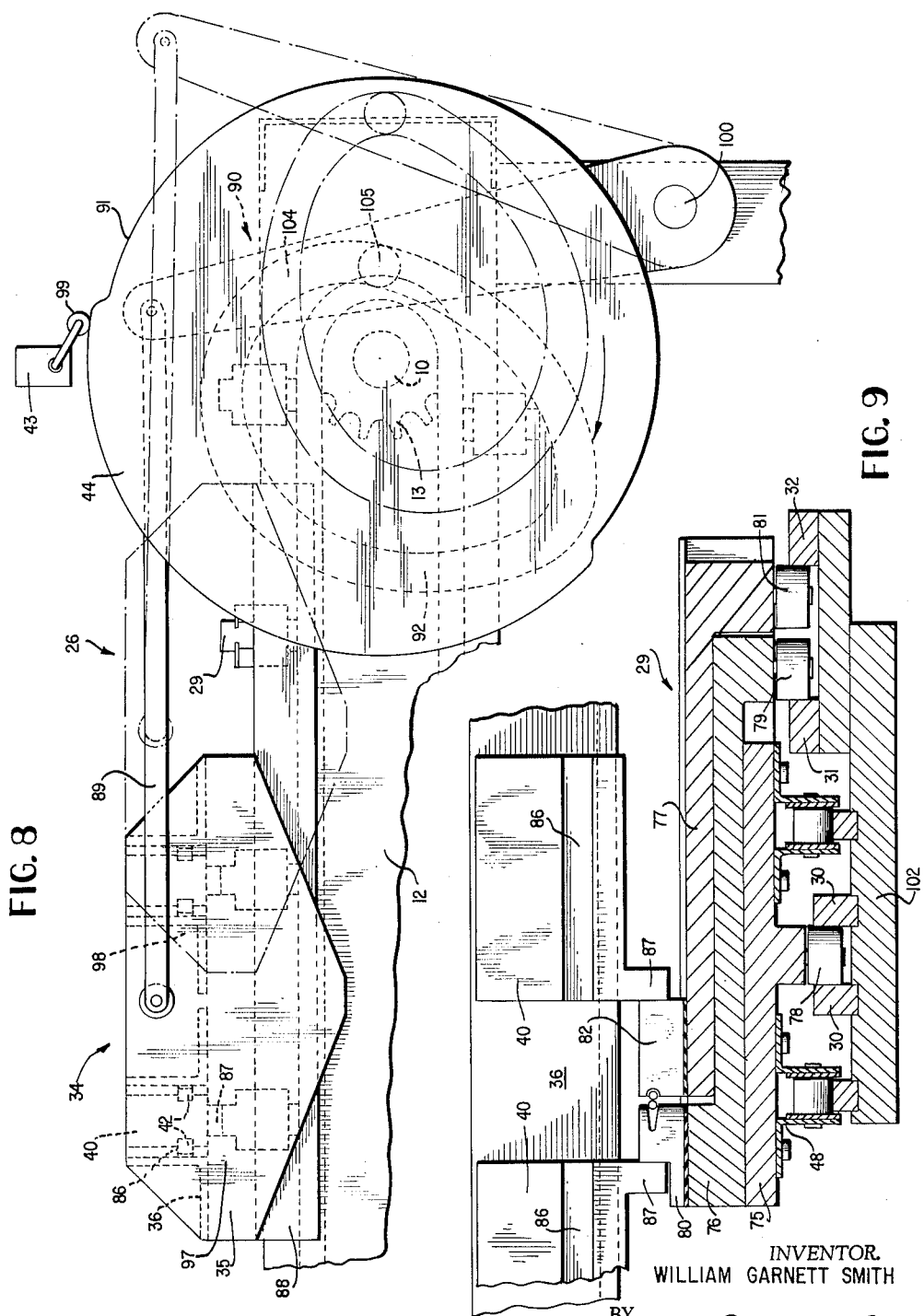

United States Patent Office 3,219,066
Patented Nov. 23, 1965

3,219,066
AUTOMATIC FORMING AND WELDING MACHINE
William Garnett Smith, Alabama Road, Ringgold, Ga.
Filed Oct. 2, 1962, Ser. No. 227,747
18 Claims. (Cl. 140—112)

This invention relates to machines for forming and welding reinforcing members from continuous wire rods, and more particularly to a machine which will perform these functions in an automatic and continuous operation.

In the manufacture of wire rod reinforcing members, which are commonly used in the fabrication of masonry walls, it is customary to form a series of alternate bends in a central member and then weld one or more additional members at the apexes of these bends. In machines of the prior art, these operations have generally been performed on a stop-and-go basis, i.e., the work-performing and work-advancing is done sequentially rather than concurrently. Such a method of operation inherently results in lost time and therefore limits the production rate of the machine.

While I am aware that machines for fabricating products from wire rods have been proposed which operate in a continuous manner, these machines have generally been unsatisfactory because they require more space than they should and are relatively inflexible as to the type of product which may be manufactured.

It is therefore an object of this invention to provide a new and improved machine which will perform bending and welding operations on wire rods or the like.

It is another object of this invention to provide such machine which will perform bending and welding operations on wire rods or the like without interruptions for work advancing, and which is capable of adjustment to vary the configuration of the member produced.

It is a further object of this invention to provide a new and improved assembly for bending wide rods or the like into a desired configuration.

It is still another object of this invention to provide a new and improved welding assembly which, in operation, does not delay advancement of the work nor sacrifice quality of the weld.

Briefly described, a preferred embodiment of the present invention is a machine having particular utility for manufacturing wire rod reinforcing members of the type commonly used in the fabrication of masonry walls. This machine comprises wire gripping and bending assemblies mounted on a conveyor which advances with the work and thereby permits the assemblies to form the wire while the latter is moving.

The wire is fed into the aforementioned gripping and bending assemblies through a reciprocable wire feed and guide member located in advance of the gripping and bending assemblies. After the wire leaves the gripping and bending assemblies it is engaged by a reciprocating welding frame assembly which applies welding current during the period that the assembly is advancing with the work. The overall machine is capable of continuous manufacture and is both compact in size and flexible in operation.

A feature of the invention is the provision of a novel wire bending mechanism which will operate as the wire is fed through the machine.

A further feature of this invention is the provision of a novel wire gripping and forming assembly which will provide a positive bending action to the wire.

Another feature of this invention is the cooperative action between the wire gripping and forming assemblies and a reciprocating feed mechanism in the formation of the wire member.

Another feature of this invention is the novel provision of a welding mechanism which will weld a number of joints while the work is being fed through the machine.

Another feature of this invention is the provision of a welding block assembly which will insure a good electrical contact with the joints to be welded.

Still another feature of this invention is the provision of a reciprocating frame assembly which will move with the work as the welding is being performed and return at a higher rate of speed so that the following sets of joints may be engaged.

Other objects, features and advantages of the present invention will become more apparent from the following detailed description taken in conjunction with the attached drawings in which:

FIG. 1 shows a formed and welded article produced by a preferred embodiment of a machine according to the present invention;

FIG. 2 is a top plan view of a preferred embodiment of a machine according to the present invention;

FIG. 5 is an enlarged view taken along line 5—5 of FIG. 3, and shows the structure of the wire gripping and bending assemblies;

FIG. 6 is a sectional view taken along line 6—6 of FIG. 5;

FIG. 7 is an end view of the machine shown in FIG. 2 looking toward the left end of the machine and showing the structure and operation of the reciprocating feed mechanism;

FIG. 8 is an enlarged detailed view and includes dotted line showing indicating operation of the welding assembly; and FIG. 9 is an enlarged detailed section view taken along line 9—9 of FIG. 2.

GENERAL DESCRIPTION

Figure 3:
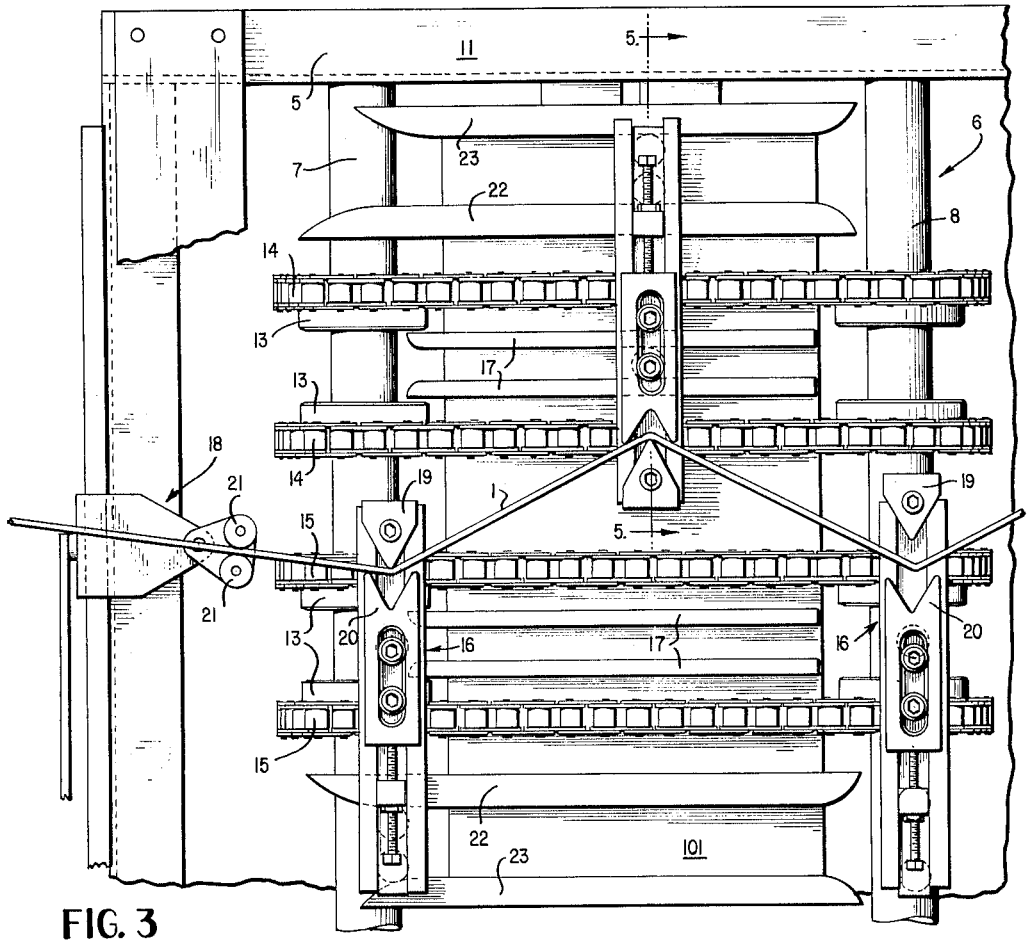
FIG. 3 is an enlarged top plan view, partly broken away, of the left end portion of the machine shown in FIG. 1.

Referring to FIG. 1, the product shown has particular utility as a reinforcing member for masonry walls. As such, it includes a central wire 1 which is formed with a series of alternating V bends. Wire rod members 2 and 3 are welded to wire 1 at the apexes or points 4. It should also be evident that the machine of the present invention has utility in the formation of other structural and decorative members constructed of pliable rod-like material.

In regard to the machine itself, reference is first made to FIG. 2 wherein the forming and welding machine is mounted on a frame 5. Mounted on the left end of the frame is the forming assembly, indicated generally at 6. Shafts 7–8 are mounted between members 11 and 12 of the frame. Mounted on these shafts, by means of sprocket wheels 13 are two pairs of endless chains 14 and 15. Each pair of chains is used to support wire gripipng and bending assemblies 16. Guides 17 are mounted between each pair of chains to prevent lateral movement of the assemblies 16. A reciprocating feed mechanism 18 is mounted on the left end of the frame 5. This mechanism is used to feed the wires into the jaws 19 and 20 of the wire gripping and bending assemblies 16 as they are moved past the feeding spools 21. Inner and outer cams 22 and 23 are mounted on platform 101 which extends between members 11 and 12. The surfaces of the cams extend in a direction parallel to the long axis of the frame; these surfaces are used to actuate the wire gripping and bending assemblies 16.

The welding assembly, indicated generally at 24 comprises two major sub-assemblies, the conveying assembly 25 and the welding frame assembly 26. The conveying assembly 25 is constructed in a manner similar to that of the forming assembly 6. Shafts 9 and 10 are mounted between members 11 and 12 of the frame 5 which support by means of sprocket wheels 13 (shown in FIG. 8) pairs of endless chairs 27 and 28. Mounted on these chains are wire gripping assemblies 29. Guideways 30 are provided to prevent transverse movement of the gripping assemblies 29. Cam surfaces 31, 32 and 33 are provided to control relative movement of portions of the gripping assemblies.

The welding frame 26 is a reciprocating assembly which is adapted to engage designated pairs of the wire gripping assemblies, move along with the conveyor at the same rate of speed, apply welding current to the wires clamped in the wire gripping assemblies during that movement, release the gripping assemblies when the welding operation is completed and return at a higher rate of speed to engage a following pair of gripping assemblies. The welding frame includes a support 34 which comprises end members 35 and transverse beams 36. Mounted on the beams 36 are the welding block assemblies 37. These assemblies include actuating cylinder 38, levers 39, welding blocks 40 and supporting frames 41. As shown in FIG. 8, the welding blocks are slideably seated on flanges 42 which extend inwardly from the transverse beams 36 and are electrically insulated therefrom. Actuation of the welding frame is controlled by operation of the cam and follower assembly shown in FIG. 8. Welding current is supplied by means of cables (not shown) mounted in suitable receptacles on welding blocks 40. Hydraulic or air power for the actuating cylinders 38 is supplied through a solenoid valve (not shown) by hoses (not shown) attached to the cylinders and supported generally on the welding frame support 34.

Sequencing of the application of welding current and actuation of the cylinders 38 is controlled by means of the microswitch 43, and cam 44, and a suitable timing circuit (not shown). The actual operation of the machine is described hereafter.

DETAILED DESCRIPTION

(a) Wire gripping and bending assembly

Referring generally to FIGURES 2–5, the wire gripping and bending assembly 16 comprises a base 45 and two gripping and bending members 46 and 47 having complementary shaped gripping and forming dies 19 and 20. The base 45 has a generally U shaped cross-section (FIG. 6). When mounted on the conveyor chains 14 or 15, the bottom of the base extends down to the first camming surface 22, whereas the walls extend to the second surface 23. The base is mounted on the conveyor chains 14 or 15 by brackets 48, which slip over the pins 49 of the conveyor links. It should be apparent that the spacing of the wire forming and gripping assemblies may be readily adjusted, as the brackets may be mounted on any link in the chain. The brackets are attached to the base by means of rivets or screws, indicated generally at 50. Mounted on a lower extension 51 of the base 45 is a guide roller 52. This roller is received between the guides 17 and is used to prevent transverse movement of the assembly 16. A slight clearance should be allowed to permit a rolling action between the roller 52 and one surface of the guides 17.

Slideably mounted within the U-shaped recess of the base 45 is the inner gripping and bending member 46. As shown in FIG. 5 the member has a generally Z shaped configuration. Mounted on one leg of the Z is the male gripping and bending die or jaw 19. The die or jaw 19 is secured to the member 46 by means of set screw 53. At the other end of the Z, is mounted a roller 54 which rides on inner camming surface 22 and is used to control the transverse movement of the inner gripping and bending member 46.

Slideably mounted within the walls of the base 45 and on top of the inner gripping member 46 is the outer gripping member 47. The female gripping and bending die or jaw 20 is adjustably mounted on the outer member 47 by means of the set screws 55 and adjusting screw 56. The die 20 has a slot 57 in which the screws 55 are received, and a flange 58 on which the screw heads 59 are seated. The adjusting screw 56 is received through the extension 60 and bears against the end of the die 20. By adjusting the spacing of the gripping and bending dies, it is possible to vary the sharpness of the bend which will be placed in the wire to be formed. Although the gripping and forming dies are shown as having complementary V-shaped configurations, it should be apparent that other configurations may be employed.

A guide roller 61 is mounted on the rear portion of the outer gripping and bending member. This wheel rides against the outer cam surface 23 and is used to cause transverse movement of the outer member toward the inner member.

A recess 62 is provided in the outer and inner members which receives a spring 63. The action of the spring is to bias the jaws of the dies into a normally open position.

(b) Reciprocating feed mechanism

Referring to FIG. 7, the structure of the reciprocating feed mechanism 18 will now be described.

Figure 4:
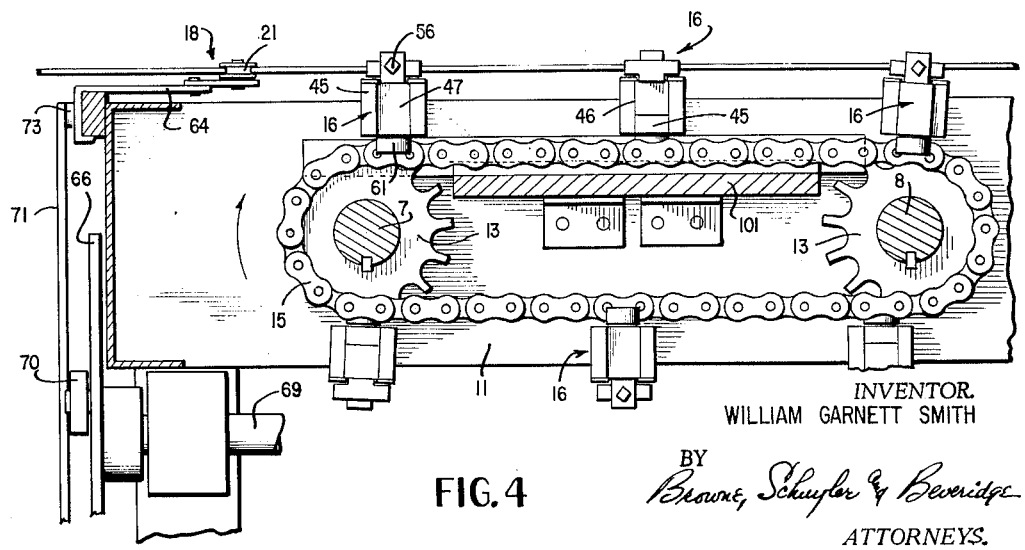
FIG. 4 is a side elevation view of the portion of the machine shown in FIG. 3, and shows the disposition of the wire gripping and bending assemblies on the conveyor chain.

The wire to be formed is fed between rotatable spools 21. These spools are mounted on spool support 64 (FIG. 4) which reciprocates in a direction transverse to that of the movement of the conveyors 27, 28. Power is transmitted to the wheel 66 by means of mitre gears 67 and 68 and shaft 69 (FIG. 4). A link 70 is pivotally mounted on the wheel 66 and pivotally attached at its opposite end to operating arm 71 which is attached to the frame 5 at 72. The opposite end of the arm is operatively associated with the spool support 64 by means of lost motion linkage 73. As the wheel 66 rotates, reciprocating movement will thus be imparted to the support by link 70, operating arm 71 and linkage 73 in an obvious manner. The frequency and length of the stroke of the mechanism may be controlled by adjusting the position of the pivot point 74.

(c) Wire gripping assembly

The structure and function of the wire gripping assembly 29 is very similar to that of the wire gripping and forming assemblies 16 previously described. Referring to FIG. 9, a base 75 upon which are mounted the inner and outer gripping members 76 and 77 is provided and is attached to the chains 27 by means of brackets 48. Transverse movement of the assembly is prevented by means of a roller 78 which rides between the guides 30. Slidably mounted on the base 75 is the inner gripping member 76 having a roller 79 riding on the inner cam surface 31, and a gripping block 80. As this block will be gripping the bent wire member, the front portion is provided with an arcuate surface. The rear portion of the block has a flat surface, the purpose of which will be described subsequently. The blocks 80 are electrically insulated from the gripping members. The outer gripping member 77 is slideably mounted on top of the inner member and is provided with a roller 81 which rides on the outer cam surface 32, and a rectangular electrically insulated gripping block 82. The guides 30 and cams 31–33 are mounted on a platform 102 which extends beneath the conveyors.

(d) Welding block assembly

A frame 41 for supporting the welding block assembly is mounted on the transverse beam 83. Two levers 39, pivoted about points 84 are provided. One end of each is attached to the actuating cylinder 38, and the opposite end is in engagement with a welding block 40. An insulating pad 85 is mounted on the lever between it and the welding block. The welding block (referring to FIGS. 2 and 8) has recesses 86 on its sides which set on flanges 42 in the beams 36 and 83. These flanges are electrically insulated from the beams. A vertical lip 87 on the block extends below the welding frame, and in operation engages the outboard surfaces of the gripping blocks 80 or 82.

(e) *Welding frame actuation assembly*

The operation of the welding frame is shown by reference to FIGS. 2 and 8. The welding frame 26 is mounted on tracks 88 (FIG. 2) on the frame 5. A link 89 is connected between the welding frame 26 and the cam follower 90. Cam 44, having outer camming surface 91 and camming groove 92 is mounted on the shaft 10. The operating of surface 91 will be described subsequently. The follower 90 comprises arm 104 which is pivotally attached to the frame at 100 and post 105 which rides in the groove 92. The groove 92 is shaped so that the follower will move to the right at a speed slower than that of its movement to the left. The speed of the follower arm to the right should be chosen to be the same as that of the conveyors 27, 28.

DESCRIPTION OF OPERATION

The power for the conveyors may be supplied by a motor mounted within the frame (not shown) and driving belts (not shown) arranged on the shafts 7–10. Rotation of these shafts will also cause operation of the reciprocating feed assembly 18 and the welding frame assembly 26 as previously described.

The wire to be formed is fed by suitable means between the spools 21 towards the conveyors 14, 15. The operation of the feed assembly is timed so that it will reach its limit of travel as the wire gripping assemblies 16 pass the point 93. At this point the wire passes between the jaws 19, 20 of the assembly. As the conveyor moves in the direction, the guide rollers 54 and 61 engage the inner and outer cam surfaces 22 and 23, respectively, and the jaws 19 and 20 move toward each other, gripping and bending the wire. Simultaneously, the feeding mechanism is moving toward the opposite pair of chains, thus facilitating the bending action of the jaws. When the feeding assembly reaches the opposite pair of chains, the gripping and forming assembly on those chains will be in position to receive the wire, the feeding assembly will reverse its direction of movement and the bending operation will be repeated.

When the assembly 16 reaches the opposite end of the conveyor, the rollers 54 and 61 will move off the cam surfaces 22 and 23 and the spring 63 will bias the jaws to their open position. The formed wire continues in its direction of movement and passes beneath the member 94. At this point, second and third wires 2 and 3 are fed by means of rollers 95 alongside the wire 1. As the peaks of the wire pass the point 96 they and their adjacent wire are engaged by the wire gripping assemblies 29. As the jaws of these assemblies are not spring biased, cam surface 33 is provided to engage the roller 81 to ensure that the jaws are in the open position. Once the wires have been engaged, cam surfaces 31 and 32 close the jaws, gripping the wire, and the gripping assemblies move toward the welding frame assembly.

The movement of the welding frame assembly is timed so that as it reaches its limit of movement to the left, gripping assemblies will be positioned between the sets of welding blocks 40. At this point the high surface of camming surface 44 (FIG. 8) will cause the microswitch 43 to close. Closing of the microswitch will initiate a timing cycle to perform the following functions:

(a) Actuate a solenoid valve (not shown) to cause fluid to be pumped to the cylinders 38.

(b) Apply welding current to the welding blocks 40.

(c) Cut off the welding current after a predetermined time.

(d) Release the solenoid valve, thereby causing the cylinders to contract.

When the solenoid is actuated, fluid pumped to the cylinders will cause them to expand. This will rotate the levers 39 about their pivots 84 forcing the lower lips 87 of the blocks into strong engagement with the flat surface of the gripping blocks 80 or 82. This operation is best shown in FIG. 9. Welding current is then applied through cables (not shown) mounted on the welding blocks.

During the time that the above-mentioned operations are taking place, the welding frame assembly is moving with the conveyor at the same speed.

When the welding current is shut off, and the solenoid valve released, the levers 39 will retract, releasing the gripping blocks. The microswitch will open when the roller 99 reaches the low surface of the cam 44, and the welding frame will start its movement to the left to engage a following pair of gripping assemblies. Because of the configuration of the cam 92, the speed of movement in this direction will be greater than that in the opposite direction.

As the rollers 79 and 81 move off the cams 31 and 32, the gripping assemblies will disengage the wire, and the completed product will pass to a suitable receptacle.

While I have described and illustrated a preferred embodiment of my invention, I wish it to be understood that I do not intend to be restricted solely thereto, but that I do intend to cover all modifications which would be apparent to one skilled in the art, and which come within the spirit and scope of my invention.

What is claimed is:

1. A machine for forming and welding an article from wire rods or the like comprising
    a frame;
    conveying means mounted on said frame for movement along a straight line path;
    a first plurality of gripping assemblies mounted on said conveying means at intervals along a first line parallel to said path of movement;
    a second plurality of gripping assemblies mounted on said conveying means at intervals along a second line parallel to said path of movement and spaced from said first line;
    said gripping assemblies in said first and second plurality being identical to each other and each having a pair of relatively movable jaws for gripping and bending a wire fed thereto;
    means for feeding a first wire transversely to said path of movement alternately to one of said assemblies in said first plurality and then to one of said assemblies in said second plurality;
    actuating means for moving said jaws to grip and bend the wire fed thereto;
    means for feeding a second wire to said machine;
    means for gripping said first and second wires in a juxtaposed position at predetermined points;
    and means for welding said first and second wires at said predetermined points.

2. A machine for forming and welding according to claim 1 wherein said wire gripping and bending assembly comprises: a base mounted on said conveyor; a first gripping and bending member movably mounted on said base; a second gripping and bending member movably mounted on said base, said actuating means causing movement of said first and second gripping members relative to each other and to said base.

3. A machine for forming and welding according to claim 2 wherein a die is adjustably mounted on one of said gripping and bending members.

4. A machine for forming and welding according to claim 2 wherein said actuating means comprises a plurality of cams mounted on said frame and cam followers mounted on said first and second gripping and bending members, said cams having actuating surfaces extending substantially parallel to the direction of movement of said conveying means and being adapted to move said jaws from a normally open to a closed position.

5. A machine for forming and welding according to claim 4 including means for biasing said jaws in an open position.

6. A machine for forming and welding an article from wire rods and the like comprising: a frame; means for forming a first wire into a series of alternate bends; a conveyor mounted on said frame; wire gripping means mounted on said conveyor; means for feeding a formed first wire to said conveyor and said gripping means; means for feeding a second wire to said conveyor and said gripping means, said gripping means on said conveyor gripping said first and second wires in a juxtaposed position; a welding assembly movable with said conveyor, said conveyor, said welding assembly including welding blocks movably mounted on said assembly; means for engaging said gripping means with said welding blocks; and means for applying current to said welding blocks and said gripping means whereby said wires are welded in their juxtaposed position.

7. A machine for forming and welding according to claim 6 wherein said means for engaging said gripping means with said welding blocks comprises an expansible cylinder and a pair of levers engaging the ends of said cylinder, the opposite ends of said levers being operatively associated with said welding blocks.

8. A machine for forming and welding according to claim 6 wherein said welding assembly includes a welding frame mounted on slides on each side of said conveyor and reciprocating means for moving said frame in the same direction as that of the conveyor at the same speed as that of the conveyor and in the opposite direction at a higher rate of speed.

9. A machine for forming and welding according to claim 7 wherein said welding assembly includes a welding frame mounted on slides on each side of said conveyor and reciprocating means for moving said frame in the same direction as the conveyor at the same speed as that of the conveyor and in the opposite direction at a higher rate of speed.

10. A machine for forming and welding according to claim 8 wherein said reciprocating means comprises a cam, a cam follower, and a link between said follower and said welding frame.

11. A machine for forming and welding according to claim 9 wherein said reciprocating means comprises a cam, a cam follower, and a link between said follower and said welding frame.

12. A wire bending machine comprising
a frame;
conveying means mounted on said frame for movement along a straight line path;
a first plurality of gripping assemblies mounted on said conveying means at intervals along a first line parallel to said path of movement;
a second plurality of gripping assemblies mounted on said conveying means at intervals along a second line parallel to said path of movement and spaced from said first line;
said gripping assemblies in said first and second plurality being identical to each other and each having a pair of relatively movable jaws for gripping and bending a wire fed thereto;
means for feeding a first wire transversely to said path of movement alternately to one of said assemblies in said first plurality and then to one of said assemblies in said second plurality;
and actuating means for moving said jaws to grip and bend the wire fed thereto.

13. A welding machine for welding a plurality of wires in a juxtaposed position comprising: a frame; a conveyor mounted on said frame; wire gripping means mounted on said conveyor; means for feeding a plurality of wires to said wire gripping means, said wire gripping means gripping said wires in a juxtaposed position; a welding assembly movable with said conveyor, said welding assembly including welding blocks movably mounted on said assembly; means for engaging said gripping means with said welding blocks; means for applying current to said welding blocks and said gripping means whereby said wires are welded in their juxtaposed position.

14. A welding machine according to claim 13 wherein said means for engaging said gripping means with said welding blocks comprises an expansible cylinder and a pair of levers engaging the ends of said cylinder, the opposite ends of said levers being operatively associated with said welding blocks.

15. A welding machine according to claim 14 wherein said welding assembly includes a welding frame mounted on slides on each side of said conveyor and reciprocating means for moving said frame in the same direction as the conveyor at the same speed as that of the conveyor and in the opposite direction at a higher rate of speed.

16. A wire gripping assembly comprising: a base; means for mounting said base to a conveyor; a first gripping member slidably mounted on said base; a second gripping member slidably mounted on said base, said member having gripping surfaces cooperative with each other to engage a wire placed therebetween; and cam followers mounted on said first and second members for moving said members relative to each other.

17. A wire gripping assembly according to claim 16 wherein said wire gripping surfaces comprise bending dies.

18. A wire gripping assembly according to claim 16 wherein said wire gripping surfaces comprise conductive blocks insulatedly mounted on said members.

References Cited by the Examiner
UNITED STATES PATENTS

| | | | |
|---|---|---|---|
| 1,615,666 | 1/1927 | Wright | 140—71 |
| 1,639,652 | 8/1927 | Fay | 140-112 |
| 1,639,653 | 8/1927 | Fay et al. | 140—112 |
| 2,868,952 | 1/1959 | Schulte et al. | 140—112 |

CHARLES W. LANHAM, *Primary Examiner.*